Figure 1A:
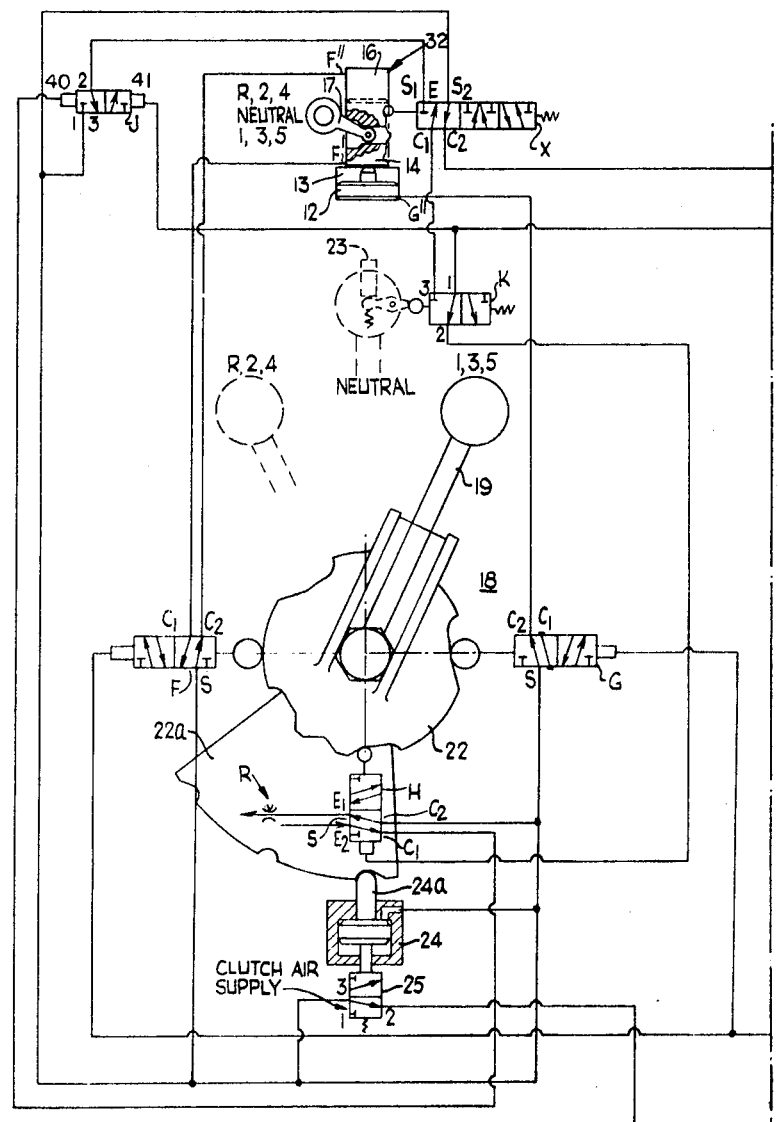

United States Patent
Beech et al.

[15] 3,664,470
[45] May 23, 1972

[54] FLUID CONTROLS WITH INTERLOCK FOR CLUTCH AND TRANSMISSION

[72] Inventors: Austin Sidney Beech, Harpenden; Roy Burrows, Wolverton, both of England

[73] Assignee: Austin S. Beech & Company Limited-Energy Works, Leighton Buzzard, Bedfordshire, England

[22] Filed: July 1, 1970

[21] Appl. No.: 51,559

[30] Foreign Application Priority Data

July 24, 1969 Great Britain..................37,366/69

[52] U.S. Cl..................................192/3.57, 74/335, 91/61, 91/412
[51] Int. Cl..........................................B60k 21/00
[58] Field of Search..........................192/3.57, 3.58

[56] References Cited

UNITED STATES PATENTS

| | | |
|---|---|---|
| 2,388,088 | 10/1945 | Sanford et al..........................192/3.57 |
| 2,753,025 | 7/1956 | Reis..................................192/3.57 X |
| 3,422,939 | 1/1969 | Biabaud..............................192/3.57 |
| 3,570,636 | 3/1971 | Franz.................................192/3.57 |

Primary Examiner—Benjamin W. Wyche
Attorney—Waters, Roditi, Schwartz & Nissen

[57] ABSTRACT

A pressure fluid operated control system incorporates an actuator member movable in a first direction along a path from which, at predetermined positions on the path, the actuator is movable into and out of operative positions in a second, transverse, direction. The invention provides first and second fluid actuator means for displacing the member in the two directions and incorporates, in controlling valve means for the actuator means, two interlock valves each of which is responsive to the operation of one of the fluid actuators and is connected in the supply to the other whereby each fluid actuator can only be operated if the other is correctly positioned.

14 Claims, 5 Drawing Figures

FLUID CONTROLS WITH INTERLOCK FOR CLUTCH AND TRANSMISSION

This invention relates to pressure fluid operated control systems for the control of a transmission including a pressure fluid operated clutch and a gear change device and is concerned with the provision of such a system for the control of a gear box which requires an actuator movable along a path from which, at predetermined positions on the path, the actuator is movable into and out of operative positions in a direction transverse to the path. An example of such equipment is a change speed gear box for a motor vehicle where a gear lever is movable along an H-shaped, or substantially H-shaped, path for the purposes of changing gear.

With gear boxes for heavier vehicles, considerable effort is needed on the part of the driver to operate the gear lever leading in the past to the provision of servomechanisms to assist gear lever operation.

The invention is concerned with the provision of an improved pressure fluid operated control system in which movement of the actuator is effected wholly by action of pressure fluid.

Accordingly the invention provides, in a transmission system including a gear change system, a pressure fluid operated control system incorporating an actuator member movable in a first direction along a path from which, at predetermined positions on said path, it is movable into and out of operative positions in a second, transverse, direction, first and second pressure fluid actuator means connected to the member and capable of respectively displacing the member in both said directions and control valve means connected to the actuator means and being arranged for connection to the pressure fluid supply, whereby the actuator member can be moved between any two of its operative positions, the control valve means incorporating two interlock valves each of which is responsive to the operation of one of the actuator means and is connected in the supply to the other, whereby the second said actuator means can only be operated if the actuator member is in one of said predetermined positions and the first said actuator means can only be operated if the actuator member is in an inoperative position.

Preferably the system is a gear change system in which movement of the actuator member in the first direction is gear selecting movement and actuator movement in the second direction is gear engaging or disengaging movement.

The control system may include a pressure fluid operated clutch control device connected to the control valve means and an interlocking arrangement whereby pressure fluid cannot be supplied to the first and second actuator means to engage or disengage a gear until the clutch control device has been fully operated to disengage the clutch.

Conveniently a gear selector lever movable in the manner of a gate change gear lever is provided for operating the control valve means, the interlocking arrangement incorporating a pressure fluid operated locking member arranged to be urged into mechanical engagement with the lever and requiring the supply of pressure fluid for withdrawal from the lever.

The locking member when engaging the gear lever may permit limited gear lever movement which is insufficient to effect a gear change and the clutch control device is arranged to be controlled by the gear lever such that operation of the lever through its limited movement causes disengagement of the clutch.

The lever is preferably movable within the range of its limited movement beyond each gear engaged position so as to cause the clutch control device to disengage the clutch which is re-engaged on return of the lever to the gear engaged position.

Figure 1A:
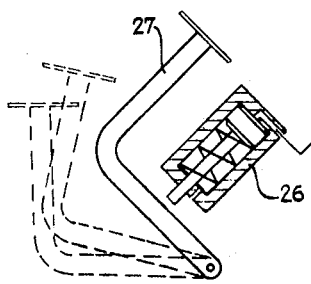
Figure 1B:
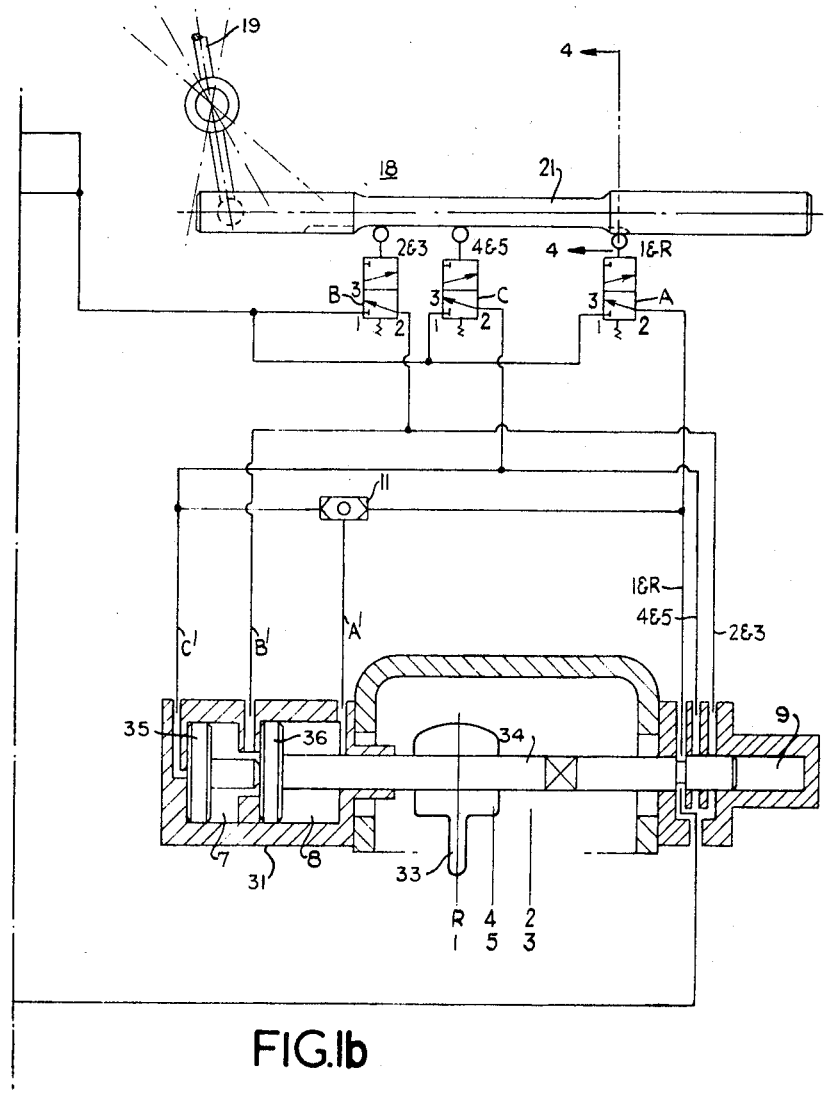
Figure 4:
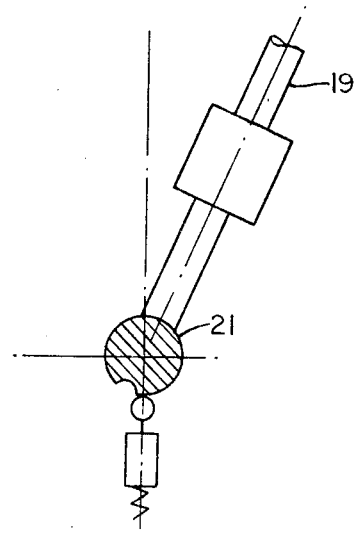
Figure 2:
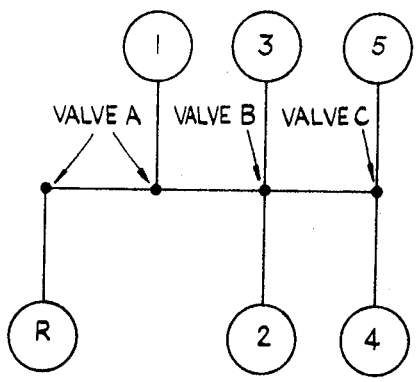
Figure 3:
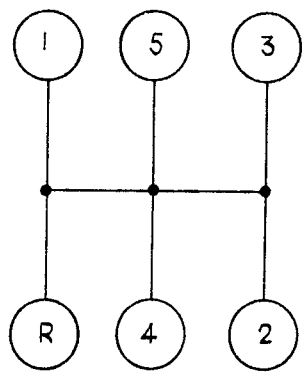

In order that the invention may be more fully understood, a preferred pressure fluid control system in accordance with the invention and as employed to control a five speed and reverse gear box, will now be described, by way of example, with reference to the accompanying drawing in which, FIGS. 1a and 1b together show a schematic illustration of the arrangement, FIG. 2 illustrates the gear positions of the gear control lever, FIG. 3 shows the gear positions of the gear box, and FIG. 4 is a diagrammatic section through a part of the apparatus of FIG. 1 along the line 4—4.

Referring to the drawing, the system includes a gear box actuator unit which is illustrated as consisting of a gear selector cylinder 31 (FIG. 1b) and a gear engaging cylinder 32 (FIG. 1a). In practice the cylinders 31 and 32 are combined in a single actuator unit. The function of the cylinder 31 is to displace an actuator arm 33 which projects into the gear box and engages with the gear selector mechanism, along a path which is the line of neutral movement of the actuator. The function of the cylinder 32 is to rotate the rod 34, on which the actuator is mounted, at particular positions along the neutral line determined by the cylinder 31 so as to cause the actuator arm 33 to engage a particular gear. In more detail, cylinder 31 incorporates two cylinder chambers 7 and 8 housing pistons 35 and 36 respectively. The lengths of the cylinders are chosen to give three positions for the actuator arm 33, the first being that adopted when the pistons are in the positions shown, the second when the piston 35 is at the other end of its cylinder, piston 36 then being intermediate its two end positions, and the third when the piston 36 is at its other end position. The positions are, as indicated in the drawings, the reverse/first gear, fourth/fifth gear and second/third gear positions respectively. These are indicated in the drawing as "R 1", "4 5" and "2 3" respectively. The cylinder chambers which are operated by compressed air, are provided with three ports A', B' and C', ports A' and B' being employed to select the R,1 and 2,3 positions and both ports A' and C' being employed to attain the 4,5 position, its being noted that of the effective piston areas presented to the ports A' and C', that of piston 35 is larger. Air is selectively supplied to the three ports by valves A, B and C respectively, the supply lines between the valves A and C and their respective ports A' and C' being interconnected by a self-selecting valve 11 having two inlets and one outlet which ensures that air in the C—C' supply line passes into the A' supply line to charge chambers 7 and 8 in the required manner when the 4,5 position is desired. The manner in which valves A, B and C operate and the means for operating them will be described in more detail later.

The cylinder 31 also incorporates a gear position interlock valve 9 provided with three inlet ports "1 & R" "4 & 5" and "2 & 3" which are respectively connected to the supply lines A—A', C—C' and B—B'. The valve has a single outlet port. Furthermore it incorporates a valve spool forming an extension of, or otherwise connected to, the rod 34 and the arrangement is such that in any one of the three positions of the actuator arm 33, the relevant inlet port is connected to the outlet port for the purposes of providing a pilot signal as will be described in more detail later.

The cylinder 32 is also a three position cylinder and houses a relatively large diameter piston 12 in a chamber 13 and a relatively small diameter piston 14 in a chamber 16, the latter piston being in engagement with an arm 17. Three angular positions of the arm 17 are determined by the two end positions of the piston 14 and by the end position other than that shown for the piston 12. These positions are respectively the first/third/fifth gear positions, the neutral position and the reverse/second/fourth gear positions indicated as "R,2,4", "NEUTRAL" and "1,3,5" in the drawing. To achieve these positions, the cylinder is provided with three i.e. F', F'', G'' of which ports F' and F'' are connected to a control valve F and port G'' to a control valve G. For the purposes of providing an interlock as will be described in more detail later, the cylinder 32 is connected via a linear cam on the piston 14 to a three position change over valve X, the valve member of which is moved into one extreme position in the neutral position of the arm 17 and into its other extreme position in either of the R,2,4 and 1,3,5 positions, i.e., when any gear is engaged, passing through a third, intermediate, position in changing between the neutral and gear engaged positions.

In order to control the cylinders 31 and 32, there is provided a gear lever valve selector unit 18 shown in side view in FIG. 1b and end view in FIG. 1a and consisting of a gear lever 19 mounted on a shaft 21. The shaft is both axially and angularly displaceable, axial movement of the shaft which takes place in a central angular position, being the normal gear selector movement in the neutral position and the angular movement which takes place in any one of four axial positions of the shaft being the gear engaging movements. FIG. 2 shows the actual gear lever positions, FIG. 3 showing the corresponding gear positions of the gear box selector mechanism. The valves A, B and C are cam operated by the shaft 21 and the arrangement is such that the valve A is operated when either reverse or first gear is selected, valve B when either second or third gear is selected and valve C when either fourth or fifth gear is selected. The shaft 21 also carries a cam disc 22 (FIG. 1a) for controlling two valves F and G. The plunger of valve F is depressed by the cam 22 in any position of the gear lever other than the R,2,4 position when pilot air from the interlock valve 9 may change the valve over. Valve G operates in a similar manner but may only be changed over by pilot air in the 1,3,5 gear position. The cam 22 is also operative to depress the plunger of a further, main, valve H which may be returned by pilot air. The gear lever carries a knob at its upper end incorporating a thumb button 23 which is connected through a spring loaded lever to a spring loaded change over valve K. The spring loaded lever connects with valve K in the neutral gear lever position only and does not connect with valve K when the gear lever is in the 1,3,5 and R,2,4 gear positions. This same spring loaded lever also acts as a locking device by engaging with any one of three recesses (not shown) which define the three angular positions of the shaft 21. The button must be depressed before the gear lever can be moved from any one of its positions. With the gear lever in its neutral position, depression of the thumb button 23 allows valve K to change-over under the action of the valve spring.

In order to provide an additional gear lever lock, a further control cylinder 24 is provided, the piston rod 24a of which is engageable with any one of three notches in a quadrant 22a secured to the cam 22. It should be mentioned here that although the rod 24a prevents movement of the gear lever from a gear engaged to the neutral positions (as well as gear lever movement from neutral to a gear engaging position), it does allow $7\frac{1}{2}°$ of gear lever movement towards the neutral position and 6° of gear lever movement beyond the normal gear engaged position for a purpose which will be described later. The piston rod 24a is arranged to be withdrawn from the quadrant by compressed air providing the air pressure is at a minimum of 50 p.s.i.g. The piston is connected to a change over clutch valve 25 which is spring loaded, the spring providing the force necessary to enage the piston rod with the quadrant on exhaustion of the cylinder 24. The valve 25 is pneumatically connected between valve H and a clutch control cylinder 26 which, on operation, acts on the clutch pedal 27 of the vehicle to disengage the clutch. The piston of the cylinder 26 is spring loaded to provide for return movement to engage the clutch.

The various pneumatic connections of the system are as illustrated and it will be seen that a further change over valve J is connected in a line between valves H and X, valve J being pilot air operated in both directions. Valve H has a main supply port S and exhaust ports $E_1$ and $E_2$ and two outlet ports $C_1$ and $C_2$. The air supply is derived from an auxiliary compressed air supply fitted to the vehicle. In the position of the valve plunger shown, port $C_2$ is exhausted via port $E_1$ and speed control valve R and $C_1$ is supplied with air as illustrated, but on depression of the plunger, $C_2$ is supplied and $C_1$ is exhausted through $E_2$. Valves F and G each have two outlet ports $C_1$ and $C_2$ and one supply port S, the arrangement being such that depression of the plunger causes $C_2$ to be connected to the supply port whereas on change over of the valve, $C_1$ is connected to port S and $C_2$ exhausted. In fact, on valve G, port $C_1$ is blanked-off so that the valve is used as a three-port valve. Valve X in its neutral position closes a supply port $S_1$, and connects an exhaust port E to a first outlet port $C_1$ and a second supply port $S_2$ to a second outlet port $C_2$. In the second described condition of the above valve, supply port $S_1$ is connected to the outlet port $C_1$, outlet port $C_2$ is exhausted and supply port $S_2$ is shut-off. In the intermediate position of the valve spool the outlet ports $C_1$ and $C_2$ are both connected to exhaust. Valve K has two inlet ports 1 and 3 and one outlet port 2. With the thumb button released port 1 is connected to port 2 and port 3 is blocked. Depression of the button connects port 3 to port 2 of valve K. Valve J is a change over valve serving to shut-off an inlet port 1 and to exhaust an outlet port 2 through a third port in the condition shown being that achieved by the application of pilot air to the left-hand pilot port 40 and to establish a connection between the two ports 1 and 2 on application of pilot air to the right-hand pilot port 41. The valve 25 serves to connect port $C_2$ of valve H to the clutch cylinder 26 in the position shown and an auxiliary air supply to the clutch cylinder when the rod 24a is fully withdrawn, the first mentioned supply port then being shut-off. With the rod 24a in engagement with the quadrant 22a, ports 2 and 3 of valve 25 are connected. When the rod 24a is withdrawn from the quadrant, ports 1 and 2 are connected.

Valves A to C are also change over valves serving to exhaust ports A' B' and C' of the cylinder 31 in the positions shown and to connect these ports to valve X when the respective plungers are depressed. Valves A to C each have their ports 1 and 2 connected when their plungers are depressed and their ports 2 and 3 connected when their plungers are released.

In the neutral positions of the gear lever with the thumb button released, valve H exhausts the inlet to the valves F and G, the selection lock cylinder 24, the clutch cylinder 26, the supply lines to the valve A to C (through valve X), the pilot air port of valve H through valve K and the right-hand pilot port 41 of valve J. Air is supplied to valve H to the left-hand pilot port 40 of valve J but this merely serves to exhaust port $S_1$ of valve X which is closed. The arm 17 of the cylinder 32 will in fact be in its neutral position as will also be the lever 19 but these have been shown in FIG. 1 in the 1,3,5 position to illustrate the next stage which will be taken as the selection of first gear. To move the gear lever, the thumb button must first be depressed thereby releasing the mechanical lock described above and also changing over valve K which connects the pilot port of valve H to an independent exhaust at valve X. The gear lever is now moved along the neutral line, if necessary, which itself has no effect on the cylinders 31 and 32 and is moved some $7\frac{1}{2}°$ into the first gear position. This causes valve H to exhaust port $C_1$ and supply air from its port $C_2$. Exhaustion of port $C_1$ exhausts the left-hand pilot port 40 of valve J. Although air is supplied through valves F and G to ports F'' and G'', the cylinder 32 remains in the neutral position due to piston 12 having a larger effective area than piston 16 which piston therefore predominates. Air is also supplied to the cylinder 24 and to the clutch cylinder 26 and to the valves A to C but they will still close their supply lines. Furthermore, air is supplied to the right-hand pilot port 41 of valve J to cause this to connect port $S_1$ of valve X to this air supply. When a pressure of 50 p.s.i. has built up in the system, by which time the clutch will have been fully disengaged, the rod 24a withdraws from the quadrant 22a thereby freeing the gear lever. On further movement of the lever into the first gear position, valve A is operated to pass air to port A' of the cylinder 31. Furthermore the plunger of valve G is freed. The cylinder 31 moves the arm 33 into the R1 position thereby at the same time connecting the port 1 & R of the interlock valve 9 with the outlet port of this valve. The pilot ports of valves F and G are therefore supplied with air but only valve G changes over as it is only this valve whose plunger is freed by the cam 22. This exhausts port G'' of cylinder 32 causing the arm 17 to be moved into the 1,3,5 position. In this way first gear is engaged. Valve X connects its inlet port $S_1$ (which it will be remembered is supplied with air through valve J) to its port $C_1$ which is connected through valve K to the pilot port of valve H. This returns valve H to its original position which applies a controlled exhaust to the various cylinders. The clutch re-engages and the selector lock rod 24a re-engages the quadrant 22a. Valve X also connects the inlets of valves A to C to exhaust. Air is supplied to the left-hand pilot port 40 of valve J to change this valve over. The thumb button may be released as soon as the gear lever is in either of the angular positions 1,3,5 and R,2,4 without affecting any change in the sequence now initiated.

To change from first to second gear, the thumb button is again depressed and the clutch disengaged as before. However, movement of the lever 19 into the neutral position depresses the plunger of the valve G which supplies port G'' with air thereby moving the arm 17 into the neutral position. It is to be noted that no air is fed to the valves A to C until arm 17 moves into the neutral position because port $S_2$ of valve X is shut-off until the neutral position is reached. No operation of cylinder 31 takes place whilst the gear lever is moved along the neutral line but as soon as the second gear position is entered, valve B is operated and valve F freed by the cam 22. Air to the port B' causes the arm 33 to be moved to the 2,3 position and only when this position has been reached does the interlock valve 9 allow pilot air to be fed to both valves F and G. Valve F is changed over exhausting port F'' and causing port F' to be supplied with air (in addition to port G'' which is supplied from valve G). Second gear is thereby engaged with valve X causing valve H to change over as before to bring about controlled engagement of the clutch, engagement of the gear selector lock rod 24a and changing over of valve J. If it is desired to re-engage the clutch in neutral for double-declutching purposes, it is only necessary to release the thumb button and air from port $C_2$ of the valve X passing through valve K, changes valve H over. Valve J will also be changed over. To disengage the clutch, the button must be depressed and the gear lever moved through 7½° to initiate withdrawal of the clutch. If the button is released with the gear lever is in neutral and before the gear box is in neutral, the clutch will not re-engage on account of valve X preventing pilot air from being supplied to valve H via valve K.

If it is required to declutch without disengaging a selected gear, the gear lever is moved a further 6° beyond the gear position and held in that position until it is desired to release the clutch. This causes valve 25 to change over by the depression of lock rod 24a by the cam 22a effecting withdrawal of the clutch without depressing the plunger of valve H and whichever of the two valves F and G has been released and changed over by pilot air.

The operation of the system when other gear changes are made will be apparent from the operation when the two changes described above are made.

It will be seen that the arrangement described above provides a wholly pneumatically controlled gear change system. Furthermore the system incorporates adequate safety measures and interlocks. These are:

1. The control circuit is only operative when the thumb button is depressed and the gear lever moved through 7½° either towards or from the neutral gear lever position and only then providing air is available at a minimum of 50 p.s.i.
2. The gear lever cannot be moved into a gear engaging position unless the lever has passed through the neutral position.
3. The gear lever is locked in every gear position and in the neutral position and is only released on depression of the thumb button and when air is available at the minimum 50 p.s.i. pressure.
4. A gear can only be selected when the selector arm 33 is in the appropriate gate position due to the provision of the interlock valve 9.
5. Air supply to move the selector arm 33 along the neutral line is not available until the gear selector arm 17 is in neutral due to the valve X.
6. The selector arm 33 will follow the movement of the gear lever irrespective of speed of movement of the gear lever, i.e. gear lever movements may be faster than the movements of the selector arm 33.
7. The speed of clutch movement may be set at maximum safe level.
8. As all the pressure in the supply lines to the various cylinders is reduced to atmospheric pressure by the master control valve except when a gear change is effected, or the clutch operated, loss of pressure in the system does not cause any change to take place.

In an alternative arrangement the gear box and clutch may be controlled by remote push button operated valve means.

One push button would be employed for each gear and one push button for returning the gear box to the "No Drive" neutral position. This latter push button would only be depressed when changing from the "gear engaged" to "neutral" position and not when changing from gear to gear.

For example, if the gear box is in neutral and first gear is required to be engaged the push button for first gear would be depressed. The gear box will then change into first gear with the clutch being disengaged and re-engaged automatically at the appropriate times.

To change from first gear to second gear would be necessary to depress another push button used for second gear only and the change from first to second gear including clutch operation would take place automatically as mentioned above.

Depressing the neutral button will change from the last selected gear into neutral position of the gear box, disengaging the transmission completely.

Safety interlocks and actuation of the gear box are as described for the gear lever controlled system.

Indication of the gear last engaged would be provided, so that the driver would be in no doubt as to the gear in use at any time.

We claim:

1. In a transmission including a pressure fluid operated clutch and a gear change system incorporating an actuator member movable for gear selecting in a first direction along a path from which, at predetermined positions on said path, it is movable into and out of operative gear-engaging positions in a second, transverse, direction, a pressure fluid operated control system for said actuator member, which control system comprises first and second pressure fluid actuator means connected to the member and capable of respectively displacing the member in both said directions, control valve means connected to the actuator means and being arranged for connection to a pressure fluid supply, whereby the actuator member can be moved between any two of its operative positions, the control valve means incorporating two interlock valves each of which is responsive to the operation of one of the actuator means and is connected in the supply of the other, whereby the second said actuator means can only be operated if the actuator member is in one of said predetermined positions and the first said actuator means can only be operated if the actuator member is in a neutral position, a pressure fluid operated clutch control device connected to the control valve means and an interlocking arrangement interlocking the clutch control device and said fluid pressure operated control system and adapted to prevent the supply of pressure fluid to the first and second actuator means to engage or disengage a gear until the clutch control device has been fully operated to disengage the clutch.

2. A control system as set forth in claim 1, in which a gear selector lever movable in the manner of a gate change gear lever is provided for operating the control valve means, the interlocking arrangement incorporating a pressure fluid operated locking member, means urging the locking member into mechanical engagement with the lever and fluid pressure, means for withdrawing the member from the lever, the pressure of fluid required to withdraw the locking member being more than that required to cause full disengagement of the clutch by the clutch control device.

3. A control system as set forth in claim 2, in which the locking member when engaging the gear lever permits limited gear lever movement which is insufficient to effect a gear change and the gear lever has means associated therewith for controlling the clutch control device such that operation of the lever through its limited movement causes disengagement of the clutch and a supply of pressure fluid to the gear lever locking member to cause its withdrawal.

4. A control system as set forth in claim 3, in which the lever is mounted to be movable within the range of said limited movement beyond each gear engaged position and the clutch controlling means is operative when the gear lever is so moved to disengage the clutch which is re-engaged on return of the lever to the gear engaged position.

5. A control system as set forth in claim 4, in which the valve means includes a main valve controlled by the lever and a clutch valve controlled by the locking member, the clutch valve being connected between the main valve and the clutch control device and being connectible to an auxiliary pressure fluid supply.

6. A control system as set forth in claim 5, in which the main valve and the interlock valve responsive to the second actuator means are so connected to one another that the clutch is re-engaged following a gear changing operation and with the gear lever in a gear engaged position, in response to a signal from the interlock valve indicating that a gear is actually engaged.

7. A control system as set forth in claim 3, including a manually operated valve having a manually operated control element carried by the gear lever which element is required to be depressed before the lever can be moved out of a gear engaging position and being so connected that release of the element in the neutral position of the lever effects engagement of the clutch and re-depression of the element and movement of the gear lever through its limited movement towards a gear engaging position effects disengagement of the clutch and a supply of pressure fluid to the gear lever locking member to cause its withdrawal.

8. A control system as set forth in claim 7, in which the first actuator means comprise a multi-position gear selecting piston and cylinder device and said valve means incorporate selector cylinder operating valves controlled by the gear lever to cause the selector piston to follow selecting movement of the lever.

9. A control system as set forth in claim 8, in which the second actuator means comprise a three position gear engaging piston and cylinder device and said valve means incorporate operating valves for the gear engaging cylinder and controlled by the lever to cause the gear engaging cylinder to follow engaging/disengaging movement of the lever.

10. A control system as set forth in claim 9, in which the main valve is a pilot return change-over valve having an inlet port connectible to a main pressure fluid supply and two exhaust ports and first and second outlets which are respectively exhausted and connected to the pressure fluid supply on movement of the lever through its said limited movement and which are respectively connected to the supply and to the exhaust on return of the valve, the gear lever locking member, the clutch control valve and the gear engaging valves being connected to the second outlet.

11. A control system as set forth in claim 10, in which the interlock valve responsive to the gear engaging cylinder has a first inlet connected to the second outlet of the main valve through a further valve, a second inlet connected directly to the second outlet of the main valve, a first outlet connected to a first inlet of the manually operated valve and a second outlet connected to a second inlet of the manually operated valve and to the gear selector valves, the valve operating to connect the first inlet to the first outlet in a gear engaging position of the cylinder and the second inlet to the second outlet in the neutral position of the cylinder, the other outlet in each case being exhausted, and the manually operated valve having a common outlet connected to the pilot return of the main valve.

12. A control system as set forth in claim 11, in which the further valve is a pilot operated three port valve having a first pilot inlet connected to the first outlet of the main valve and a second pilot inlet connected to the second outlet of the interlock valve responsive to the gear engaging cylinder, pressure at the first and second pilot inlets respectively closing and opening the valve.

13. A control system as set forth in claim 12, in which the gear engaging valves comprise a pilot return change-over valve and a pilot return three port valve each having an inlet connected to the second outlet of the main valve and having a pilot return connected to the outlet of the interlock valve responsive to the gear selector cylinder.

14. A control system as set forth in claim 2, wherein the gear lever locking member is a piston and cylinder controlled locking rod engageable with a quadrant secured to the lever.

* * * * *